United States Patent
Li

(10) Patent No.: US 10,467,776 B2
(45) Date of Patent: Nov. 5, 2019

(54) INFORMATION PROCESSING METHOD AND APPARATUS, TERMINAL, AND STORAGE MEDIUM

(71) Applicant: TENCENT TECHNOLOGY (SHENZHEN) COMPANY LIMITED, Shenzhen (CN)

(72) Inventor: Bin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/785,494

(22) Filed: Oct. 17, 2017

(65) Prior Publication Data

US 2018/0040144 A1 Feb. 8, 2018

Related U.S. Application Data

(63) Continuation of application No. PCT/CN2016/082621, filed on May 19, 2016.

(30) Foreign Application Priority Data

Sep. 7, 2015 (CN) .......................... 2015 1 0562542

(51) Int. Cl.
*G06F 3/0481* (2013.01)
*G06T 11/00* (2006.01)
(Continued)

(52) U.S. Cl.
CPC .......... *G06T 11/001* (2013.01); *G06F 3/0483* (2013.01); *G06F 3/04817* (2013.01); *G06F 16/958* (2019.01); *G06T 2200/24* (2013.01)

(58) Field of Classification Search
CPC ............... G06T 11/001; G06T 2200/24; G06F 3/04817; G06F 3/0483
See application file for complete search history.

(56) References Cited

U.S. PATENT DOCUMENTS

| | | | |
|---|---|---|---|
| 8,411,112 B1 * | 4/2013 | Ainslie | G09G 5/026 345/589 |
| 2006/0044324 A1 * | 3/2006 | Shum | G06T 11/001 345/595 |
| 2016/0357363 A1 * | 12/2016 | Decker | G06F 3/0482 |

FOREIGN PATENT DOCUMENTS

| | | |
|---|---|---|
| CN | 101916168 | 12/2010 |
| CN | 103399764 | 11/2013 |

(Continued)

OTHER PUBLICATIONS

"How to Color Firefox Tabs Automatically According to Websites" written by Sourojit. Mar. 22, 2011. Accessed via web @ https://www.techlivez.conn/2011/03/how-to-color-firefox-tabs-automatically-according-to-websites/ on Jul. 5, 2018.*

(Continued)

*Primary Examiner* — Antonio A Caschera
(74) *Attorney, Agent, or Firm* — Oblon, McClelland, Maier & Neustadt, L.L.P.

(57) ABSTRACT

Aspects of the disclosure provide a terminal device including processing circuitry. The processing circuitry is configured to determine a first color configuration of a tab page, and a second color configuration of an icon, determine a representative color of the icon from the second color configuration of the icon and a background color of the tab page from the first color configuration, determine whether the background color of the tab page and the representative color of the icon satisfy a first condition that indicates a lack of discernibility over the background color, adjust the second color configuration of the icon when the representative color is determined to lack discernibility over the background color of the tab page based on the first condition, and generate image data for displaying the icon having the adjusted second color configuration in the tab page of the first color configuration.

17 Claims, 12 Drawing Sheets

(51) Int. Cl.
     *G06F 3/0483*     (2013.01)
     *G06F 16/958*     (2019.01)

(56) References Cited

FOREIGN PATENT DOCUMENTS

| | | |
|---|---|---|
| CN | 104657465 | 5/2015 |
| CN | 104731453 | 6/2015 |
| WO | 2015108611 | 7/2015 |
| WO | 2015117505 | 8/2015 |

OTHER PUBLICATIONS

U.S. Appl. No. 62/172,227, dated Jun. 7, 2015.*
International Search Report dated Aug. 18, 2016 in PCT/CN2016/082621 filed May 19, 2016 {(With English Translation).

* cited by examiner

INFORMATION PROCESSING METHOD AND APPARATUS, TERMINAL, AND STORAGE MEDIUM

RELATED APPLICATION

This application is a continuation of International Application No. PCT/CN2016/082621, filed on May 19, 2016, which claims priority to Chinese Patent Application No. 201510562542.2, entitled "INFORMATION PROCESSING METHOD AND APPARATUS, AND TERMINAL" filed by Tencent technology (Shenzhen) Co., Ltd on Sep. 7, 2015. The entire disclosures of the prior applications are hereby incorporated by reference herein in their entirety.

FIELD OF THE TECHNOLOGY

The present disclosure relates to browser display technologies, and in particular, to an information processing method and apparatus, a terminal, and a storage medium.

BACKGROUND OF THE DISCLOSURE

A browser is used to display text, images and other information in the World Wide Web or a local area network. Such text or images may be a hyperlink that connects to another website, so that a user can quickly and easily browse various information. Generally, the browser includes components for a menu bar, an edit toolbar, a standard button, a tab bar, an address path, a detailed information bar, closing a current window, maximizing a current window, minimizing current window, and the like. The tab bar serves as a container of tab pages and is configured to be an area for displaying and managing the tab pages, and is usually located at the top of the browser. People focus on the tab bar when using the browser, because they can directly see, from the tab bar, which website a web page is from and a title of the web page. To meet requirements of different users on customized personalized interfaces, the browser provides a colorful mechanism (e.g., theme personalization) and a skin change function. That is, a background of a selected state and a background of an unselected state in the tab page may be both changed due to the use of different skins.

The skin change function and the colorful mechanism of the browser may lead to a change in the background color of the tab page. Favicons of some websites may use a solid color, and if the color of the favicon is close to the background color of the tab page, the favicon may be mixed with the background color. Consequently, it is difficult for a user to identify the favicon from the tab page with naked eyes.

SUMMARY

In view of this, embodiments of the present disclosure provide an information processing method and apparatus, a terminal, and a storage medium for resolving at least one problem existing in the existing technology. When a main color of a favicon is close to a background color of a tab page, the favicon can be easily identified from a dark-colored background of the tab page in an implementation according to the disclosure, thereby improving user experience.

Aspects of the disclosure provide a terminal device including a display device and a processing circuitry. The display device is configured to display according to image data generated by the processing circuitry. The processing circuitry is configured determine a first color configuration of a tab page and a second color configuration of an icon, determine a representative color of the icon from the second color configuration of the icon and a background color of the tab page from the first color configuration, determine whether the background color of the tab page and the representative color of the icon satisfy a first condition that indicates a lack of a discernibility over the background color, adjust the second color configuration of the icon when the representative color is determined to lack the discernibility over the background color of the tab page based on the first condition, and generate image data for displaying the icon having the adjusted second color configuration in the tab page of the first color configuration.

In an embodiment, the processing circuitry is configured to receive a target color configuration that is discernible over the background color of the tab page, and adjust the second color configuration of the icon based on the target color configuration on. In an example, the processing circuitry is configured to determine the target color configuration of the icon according to the background color of the tab page and a contrasting color rule.

According to an aspect of the disclosure, the processing circuitry is configured to determine a complementary color to the background color of the tab page, and adjust the second color configuration according to the complementary color. In an embodiment, the processing circuitry is configured to determine whether the background color of the tab page satisfies a second condition for detecting a darkness level, and determine whether the background color of the tab page and the representative color of the icon satisfy the first condition when the second condition is satisfied.

Further, in an embodiment, the processing circuitry is configured to determine a ratio of a number of pixels of a specific color in the icon to a total number of pixels in the icon, determine whether the ratio is larger than a preset threshold and determine the specific color to be the representative color when the ratio is larger than the preset threshold.

In an example, the processing circuitry is configured to adjust the second color configuration of the icon without changing a transparency of the icon.

Aspects of the disclosure provide a method for generating image data. The method includes determining, by processing circuitry, a first color configuration of a tab page and a second color configuration of an icon, determining a representative color of the icon from the second color configuration of the icon, determining whether a background color of the tab page and the representative color of the icon satisfy a first condition that indicates a lack of a discernibility over the background color, adjusting the second color configuration of the icon when the representative color is determined to lack the discernibility over the background color of the tab page based on the first condition, and generating image data for displaying the icon having the adjusted second color configuration in the tab page of the first color configuration.

Aspects of the disclosure provide a non-transitory computer readable medium storing program instructions for causing a processor in a terminal device to execute the method for generating image data.

BRIEF DESCRIPTION OF THE DRAWINGS

FIG. 1-2 is a schematic flowchart of implementing an information processing method according to an embodiment of the present disclosure;

FIG. 1-3 is a schematic diagram of connecting a terminal with a server according to an embodiment of the present disclosure;

FIG. 2-1 is a schematic flowchart of implementing an information processing method according to an embodiment of the present disclosure;

FIG. 2-2 is a schematic diagram of an effect of an embodiment of the present disclosure;

FIG. 3 is a schematic flowchart of implementing an information processing method according to an embodiment of the present disclosure;

FIG. 4-1 is a schematic flowchart of implementing a tab page drawing according to an embodiment of the present disclosure;

FIG. 4-2 is a schematic flowchart of implementing a color conversion processing according to an embodiment of the present disclosure;

FIG. 8-1 is a schematic structural diagram of a composition of a terminal according to an embodiment of the present disclosure; and FIG. 8-2 is a schematic structural diagram of a hardware entity used during a communication between a terminal and a server according to an embodiment of the present disclosure.

DESCRIPTION OF EMBODIMENTS

The following first explains related technical terms involved in embodiments of the present disclosure.

A tab page: a manner for managing a web page by a browser, and one tab page corresponding to one open web page.

A tab bar: a container of tab pages, configured to display and to manage a tab page area, and usually located at the top of the browser.

A favicon: an icon of a website, usually displayed at a left side of the tab page, or displayed in a favorite or historical record.

An ARGB: a color model, where A (Alpha) represents transparency, R (Red) represents red, G (Green) represents green, and B (Blue) represents blue; using 32-bit memory structure; A, R, G, B separately occupying 8 bits (bit), so dial values all ranging from 0 to 255.

Technical problems to be resolved in the embodiments of the present disclosure lie in providing a colorful mechanism and a skin change function, thereby satisfying a requirement on customizing personalized user interface. The tab page usually displays the favicon and a page title. However, favicons of various websites generally use a particular picture, and if the favicon is in a solid color and is similar to a background color of the tab page, it is difficult for a user to identify the favicon from the tab page with naked eyes. In the following embodiments of the present disclosure, when the tab page is a dark-colored background, by converting the favicon into a solid white picture, a display effect of the favicon in the tab page is ensured.

Figure 1:
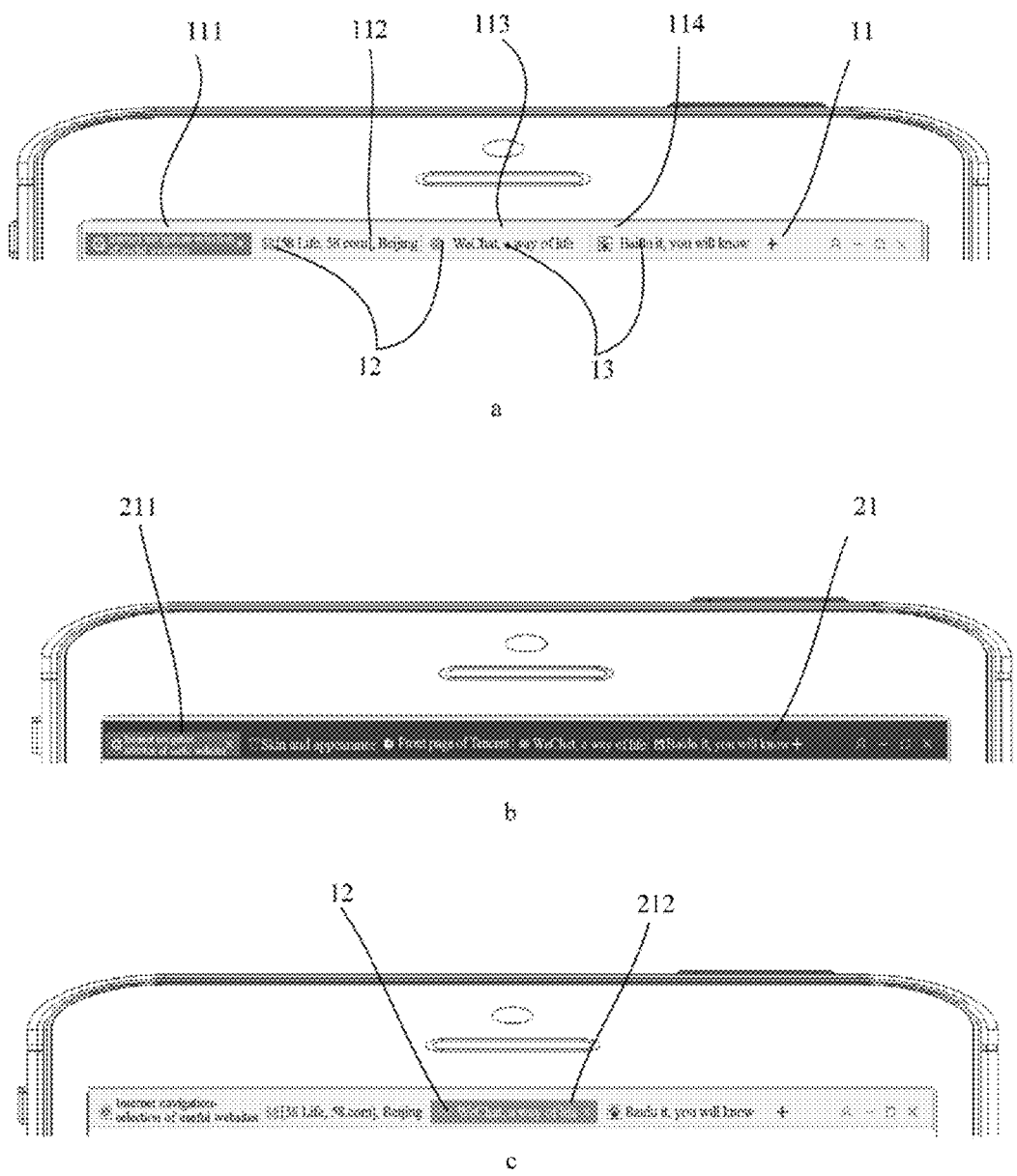
FIG. 1-1 is a schematic diagram of a state of a tab page.

FIG. 1-1 is a schematic diagram of a state of a tab page. As shown in FIG. 1-1(a), a browser usually manages a web page by means of a tub bar 11, and one tab page corresponds to one web page. In FIG. 1-1(a), the tab bar 11 entirely includes four tab pages 111 to 114. Each tab page usually displays a favicon 12 and a page topic 13. The favicon is an icon of a website, usually displayed at a left side of the tab page or displayed in a favorite or historical record. The tab page is a manner for managing a web page by a browser, and one tab page corresponds to one open web page. Generally, the tab page has two states, that is a selected state and an unselected state. For distinguishing the selected state and the unselected state in the tab page, the selected tab page usually uses a dark-colored background. In FIG. 1-1(a), a background color of the tab page 111 is darker than background colors of the tab pages 112 to 114. Therefore, it can be noticed that the tab page 111 is in the selected state, and the tab pages 112 to 114 are in the unselected state. Generally, in an example, there is one tab page in a browser that in a selected state.

To meet requirements of different users on customized personalized interfaces, the browser may provide a colorful mechanism and a skin change function. That is, a background of a selected state and a background of an unselected state in the tab page may be both changed due to the use of different skins. FIG. 1-1(b) shows an effect drawing of a browser that uses a dark-colored skin. A tab bar 21 in FIG. 1-1(b) has five tab pages, and a color of the tab bar turns into a dark color due to the skin change function of the browser. A first tab page 211 in the tab bar 21 is in the selected state, and the tab pages except the tab page 211 are all in the unselected state.

The skin change and the colorful mechanism of the browser may lead to a change in the background color of the tab page. As shown in FIG. 1-1(c), a main color of the favicon of WeChat is green. When a background color of a tab page 212 of WeChat is also green, the favicon 12 is hard to be identified (e.g., lack of discernibility).

To resolve the above existing problems, the embodiments of the present disclosure provide an information processing method that is applied to a terminal (terminal device). Functions implemented by using the information processing method may be implemented by using a processor in the terminal to call program code. Certainly, the program code can be stored in a computer storage medium. It can be learned that, the terminal at least includes the processor and the storage medium.

By means of the accompanying drawings and specific embodiments, technical solutions of the present disclosure are further described below in detail.

Figures 1, 2:
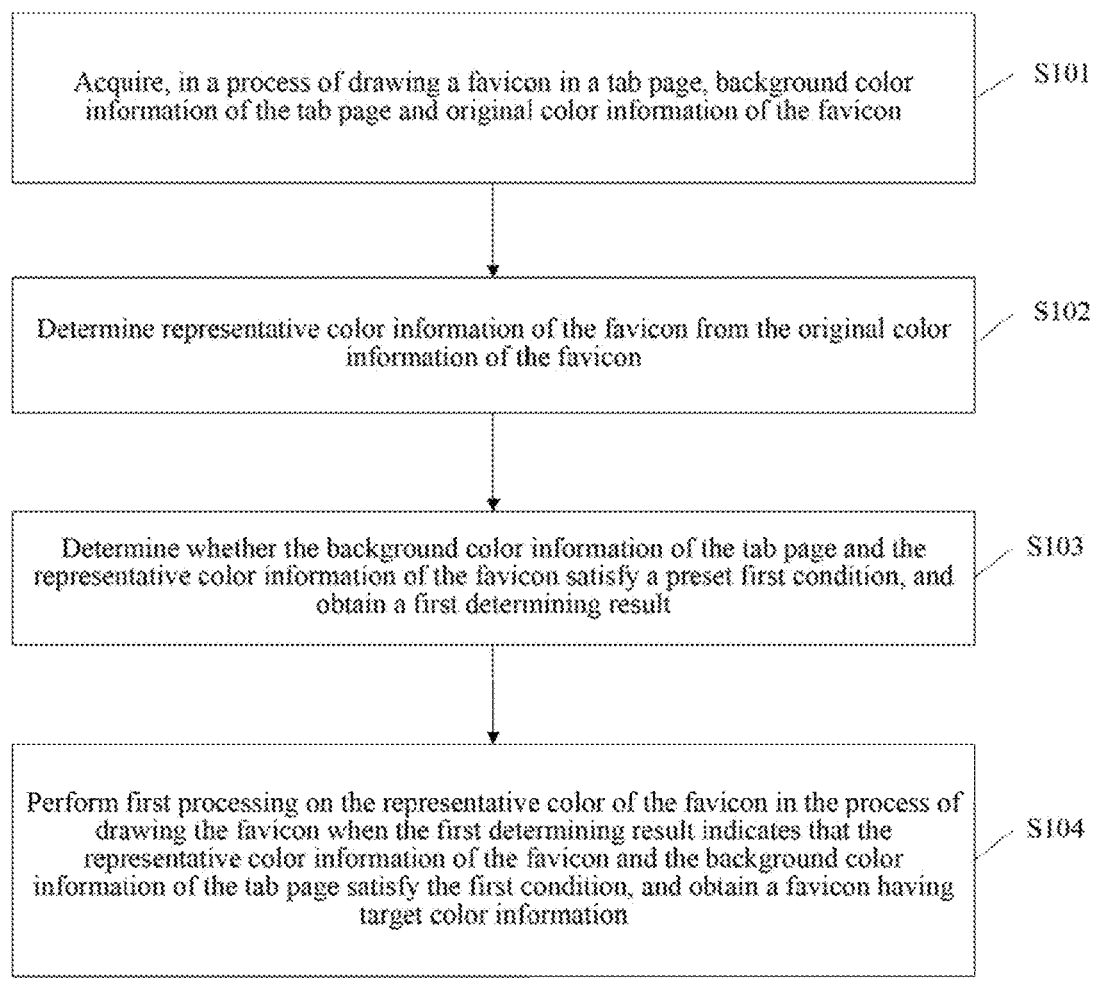

FIG. 1-2 is a schematic flowchart of implementing an information processing method according to an embodiment of the present disclosure. As shown in FIG. 1-2, the information processing method includes:

Step S101: Acquire, in a process of drawing (e.g., generating image data for displaying) a favicon in a tab page, background color information of the tab page and original color information of the favicon.

In this embodiment, during displaying a web page process, a browser may perform drawing on content of the web page and various parts of the browser, certainly including drawing on a tab bar. However, this embodiment is not intended to put emphasis on drawing other parts except the tab bar. When a user performs skin change on the browser without using a skin change function, a background color of the tab page may refer to an original background color of the tab page, and the word original means a background color of the tab page originally set by a website; when the user performs skin change on the browser by using the skin change function, the background color of the tab page may refer to a color used or selected by the user when the user performs skin change. Referring to FIGS. 1-1(a) and (c), in FIG. 1-1(a), the user does not use the skin change function; a background color of the tab page 113 is a first color; and it is assumed, that the first color is gray. In FIG. 1-1(c), the user uses the skin change function; the background color of the tab page is a second color; the second color is a color used or selected by the user when the user performs skin change; and it is assumed that the second color is green.

An original color of the favicon refers to a color used by the website when the favicon is designed. It is noted that, even if the user uses the skin change function of the browser, the color of the favicon is not usually changed. In FIG. 1-1(a), the user does not use the skin change function, the color of the favicon of WeChat is a third color. Referring to FIG. 1-1(b), the user uses the skin change function of the browser, and the color of the browser is turned into a fourth color. However, the color of the favicon of WeChat is still the third color. Therefore, the skin change does not affect the color of the favicon of WeChat. It is noted that, the first color, the second color, the third color, and the fourth color described in this embodiment may be solid colors, or may be multiple colors. The multiple colors may be mixed, or may be independent to each other. For example, the color of the favicon of WeChat includes two colors: one is green, and the other is black, where black is surrounded by green.

The color information is an expression manner of a color in a terminal. Expression manners of the color include monochrome, gray scale, multicolor, and the like. The multicolor manner is divided into an RGB mode, a CMYK mode, a Lab mode, an ARGB mode to describe the color. Generally, a display of the terminal usually uses the RGB or ARGB mode. Therefore, the background color information of the tab page and the original color information of the favicon step S101 both are the color information.

Step S102: Determine representative color information of the favicon from the original color information of the favicon.

As described above, the favicon actually is an icon of a website. Generally, in a specific implementation process, the original color of the favicon usually includes two or more than two types. In this way, one color needs to be selected from the several color information as a representative color of the favicon. In a specific implementation process, the representative color of the favicon may be a main color of the favicon, and the main color is a color having the highest number of pixels among multiple colors. When the original color of the favicon only includes one type, the only color is the representative color of the favicon.

Step S103: Determine whether the background color, information of the tab page and the representative color information of the favicon satisfy a preset first condition, and obtain a first determining result.

The first condition is a condition for determining that the representative color of the favicon is relatively close to the background color of the tab page. As shown in FIG. 1-1(c), when the background color of the tab page is green, and the representative color of the favicon is also green, in this case, it may indicate thin the background color information of the tab page and the representative color information of the favicon satisfy the first condition.

Judgment of the first condition may be determined according to a background color information value of the tab page and a representative color information value of the favicon. For example, a corresponding subtraction is performed between the background color information value of the tab page and the representative color information value of the favicon to obtain a difference, then to determine whether the difference is in a preset threshold range. When the difference is in the preset threshold range, the background color information of the tab page and the representative color information of the favicon satisfy the first condition; when the difference is not in the preset threshold range, the background color information of the tab page and the representative color information of the favicon do not satisfy the first condition.

It is noted that, the corresponding subtraction means to perform subtraction among corresponding terms in the color information. For example, when the color information is represented by using the RGB, an R value in the color information of the tab page needs to subtract an R value in the representative color information of the favicon. When the color information is represented by using the RGB, color information [R, G, B]=[255, 255, 255] represents white; and if the background color information of the tab page is [255, 255, 255], when the representative color information value of the favicon is in [(240-255), (245-255), (235-255)] range, it is determined that the background color information of the tab page and the representative color information of the favicon satisfy the first condition.

Step S104: Perform first processing on the representative color of the favicon in the process of drawing the favicon when the first determining result indicates that the representative color information of the favicon and the background color information of the tab page satisfy the first condition, and obtain a favicon having target color information.

The first processing is processing for processing a target color of the favicon to be that the background color information of the tab page and the target color information of the favicon do not satisfy the first condition.

In a specific implementation process, the first processing may be an opposite-color processing. The opposite-color processing uses an anaglyphic principle of colors, that is, red complements green, blue complements orange, and purple complements yellow. In optics, a white light can be generated by mixing two types of colored light in an appropriate percentage, and the two colors are referred to as "complementary colors". For example, when the representative color of the favicon is black, the representative color of the favicon may be white after being performed the opposite-color processing on. When the background color information of the tab page and the target color information of the favicon do not satisfy the first condition, a higher recognition degree of the favicon in a dark-colored background of the tab page can be ensured.

In this embodiment of the present disclosure, the terminal may be a fixed electronic device such as a personal computer (PC, Personal Computer), may be a portable electronic device such as a personal digital assistant (PDA), a tablet computer, or a laptop, or may be an electronic device such as a smartphone as long as the terminal can start the browser. Generally, the browser is a software application program that is disposed on the terminal. When a user wants to see words, images and other information in the World Wide Web or a local area network, the terminal may send a web request to a server of a web page. After receiving the web request, the server returns a web response to the terminal, and display content of the web page is added in the web response.

It can be learned from the foregoing descriptions, a browser is usually based on client server model (Client Server Model, C/S); that is, a browser client used as an application program is disposed on a terminal. A search engine having a C/S structure may refer to an architecture shown in FIG. 1-3. A terminal 52 is connected to a server 53 by using a network 51. A user enters a link address of a web page by using the browser that is disposed on the terminal 51 (usually implemented by using the search engine). Subsequently, the client server of the browser sends the web request to the server 53; the link address is added in the web request; the server 53 returns web request content in the web request to the terminal 51; and finally the terminal 51 displays a search result to the user.

In this embodiment of the present disclosure, a process of drawing a favicon in a tab page, background color information of the tab page and original color information of the favicon are acquired. Representative color information of the favicon is determined from the original color information of the favicon. Whether the background color information of the tab page and the representative color information of the favicon satisfy a preset first condition is determined, and a first determining result is obtained, where the first condition is a condition for determining that a representative color of the favicon is relatively close to a background color of the tab page. When the first determining result indicates that the representative color information of the favicon and the background color information of the tab page satisfy the first condition, a first processing is performed on the representative color of the favicon in the process of drawing the favicon, and a favicon having target color information is obtained, where the processing is processing for processing a target color of the favicon to be that the background color information of the tab page and the target color information of the favicon do not satisfy the first condition. In this case, when a main color of the favicon is close to the background color of the tab page, the favicon can be easily identified from a dark-colored background of the tab page, thereby improving user experience.

Based on the foregoing embodiment, an embodiment of the present disclosure provides an information processing method that is applied to a terminal. Functions implemented by using the information processing method may be implemented by using a processor in the terminal to call program code. Certainly, the program code can be stored in a computer storage medium. It can be learned that, the terminal at least includes the processor and the storage medium.

FIG. 2-1 is, a schematic flowchart of implementing an information processing method according to an embodiment of the present disclosure. As shown in FIG. 2-1, the information processing method includes:

Step 201: Acquire, in a process of drawing a favicon in a tab page, background color information of the tab page and original color information of the favicon.

Step 202: Determine representative color information of the favicon from the original color information of the favicon.

Step 203: Determine whether the background color information of the tab page satisfies a preset second condition, and obtain a second determining result.

The second condition is conditions about a tab page in a specific color that are set by a person skilled in this art. For example, the second condition may be a condition in which a background color of the tab page is a dark-colored background. In this embodiment, only when the background color of the tab page is a dark color, whether the background color of the tab page is close to the color of the Favicon can be determined. In other words, in this embodiment, only when the color of the tab page is relatively dark and the color of the tab page is close to the color of the favicon, the color of the favicon can be changed.

Step 204: Determine whether the background color information of the tab page and the representative color information of the favicon satisfy a preset first condition when the background color information of the tab page satisfies the second condition, and obtain a first determining result.

The first condition is a condition for determining that a representative color of the favicon is relatively close to the background color of the tab page.

The foregoing step 201, step 202, step 204 separately correspond to step S101 to step S103 in the foregoing embodiment. Therefore, for understanding step 201, step 202, and step 204, a person skilled in this art may refer to the foregoing embodiment.

Step 205: Acquire target color information of the favicon when the first determining result indicates that the representative color information of the favicon and the background color information of the tab page satisfy the first condition.

Step 206: Perform first processing on the representative color of the favicon according to the target color information of the favicon, and obtain a favicon having target color information.

The target color information of the favicon may be color information that is set in advance, for example, regardless of what the representative color information of the favicon is, the target color information of the favicon is white. During implementation process, when the representative color information of the favicon and the background color information of the tab page satisfy the first condition, the favicon is processed into white. In this embodiment, the technical solutions of the embodiments of the present disclosure are described by using the second condition as an example. When the following conditions are satisfied at the same time: 1) the favicon is a solid color picture; 2) the background color of the tab page is a dark-colored background; at this time, the representative color of the favicon is converted into white when the favicon is drawn; and then the converted favicon is drawn. The following continues to use the favicon of WeChat as an example. As shown in FIG. 2-2, FIG. 2-2(*a*) is the same as FIG. 1-1(*c*), and FIG. 2-2(*b*) is the favicon of WeChat after being performed the first processing on. As shown in FIG. 2-2(*b*), a main color of the favicon 12 of WeChat converts from green to white (white is a target color).

In this embodiment of the present disclosure, step 205 and step 206 actually provide an implementation manner for implementing step S104 in the foregoing embodiment.

In step 205, the acquiring target color information of the favicon includes: determining the target color information of the favicon according to the background color information of the tab page and a preset first rule.

The first rule may be an anaglyphic principle, for example, when the background color information of the tab page is black, according to the anaglyphic principle, the target color information of the favicon is white. In an example, the first rule is referred to as a contrasting color rule.

Based on the foregoing embodiment, an embodiment of the present disclosure provides an information processing method that is applied to a terminal. Functions implemented by using the information processing method may be implemented by using a processor in the terminal to call program code. Certainly, the program code can be stored in a computer storage medium. It can be learned that, the terminal at least includes the processor and the storage medium.

Figures 1, 2, 3:
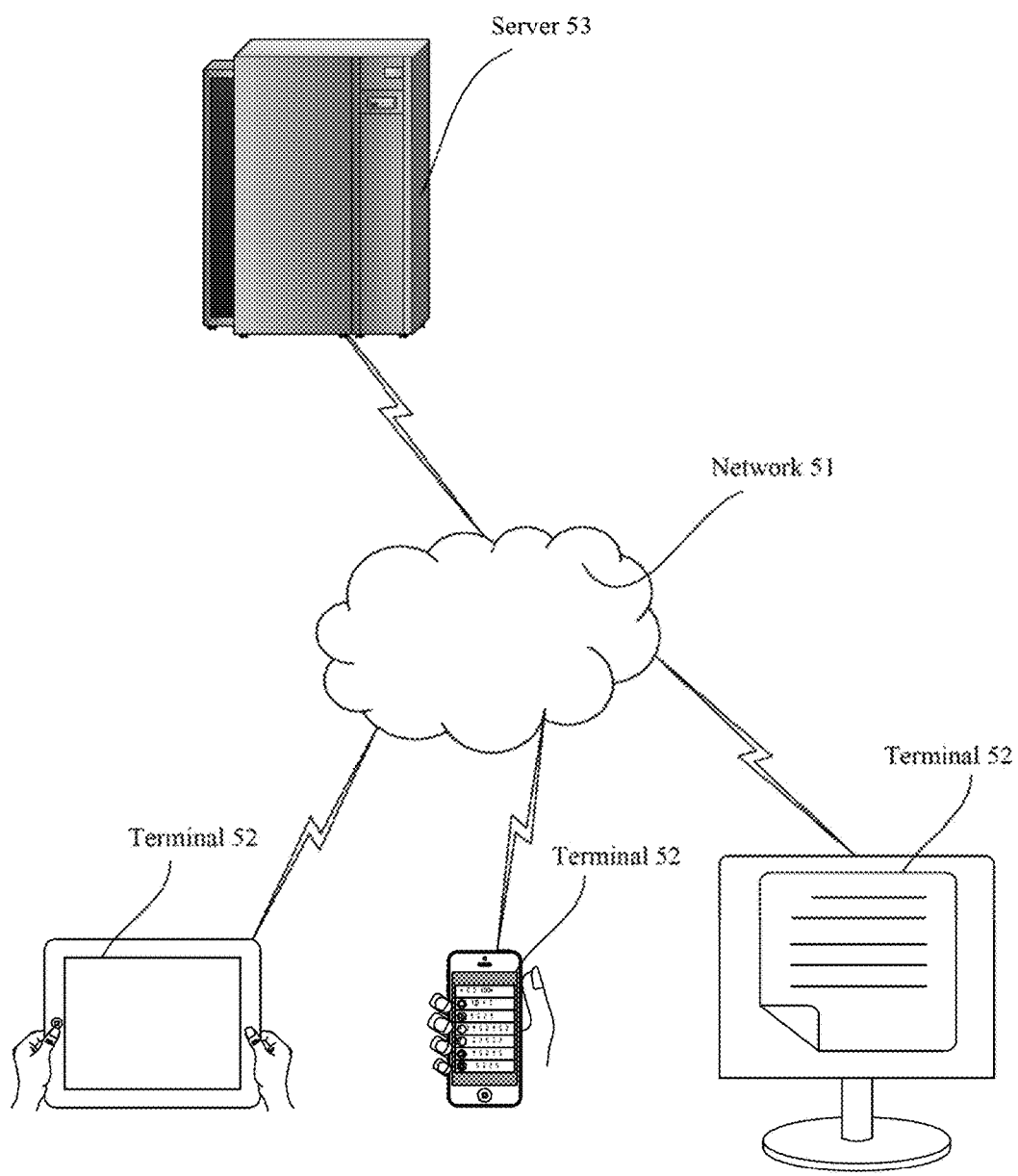
Figures 1, 2:
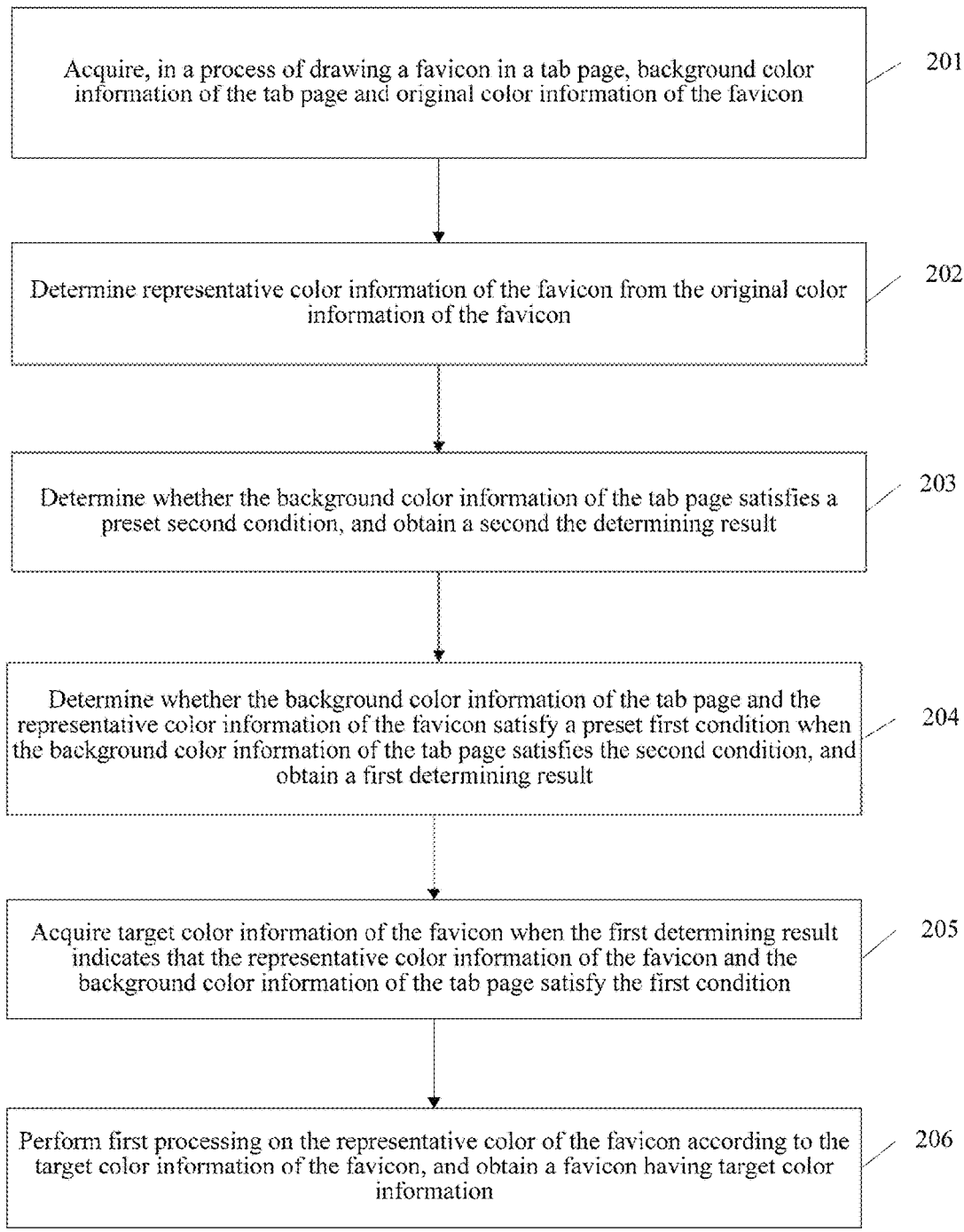
Figure 2:
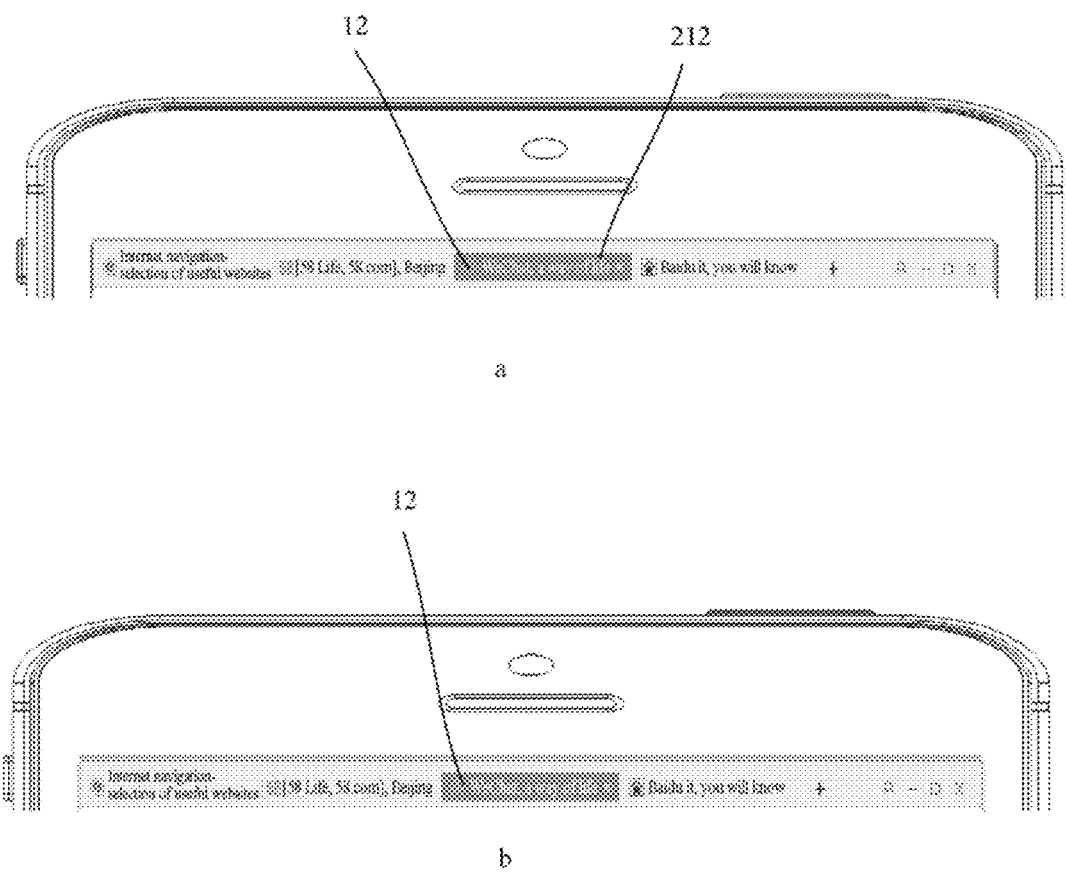
Figure 3:
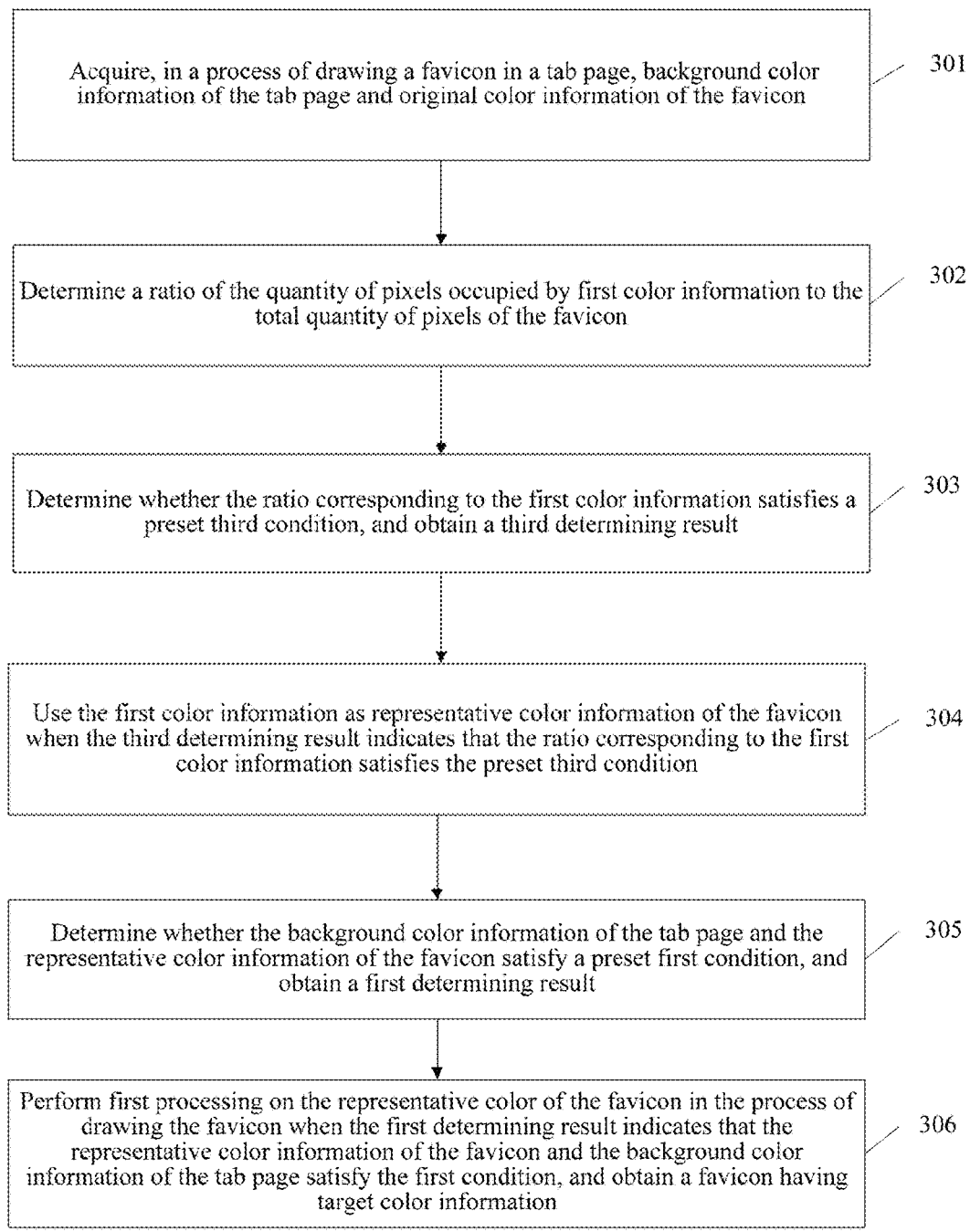

FIG. 3 is a schematic flowchart of implementing this information processing method according to an embodiment of the present disclosure. As shown in FIG. 3, the information processing method includes:

Step 301: Acquire, in a process of drawing a favicon in a tab page, background color information of the tab page and original color information of the favicon.

Step 302: Determine a ratio of the quantity of pixels occupied by first color information to the total quantity of pixels of the favicon.

The first color information is any one of color information in the original color information of the favicon.

Step 303: Determine whether the ratio corresponding to the first color information satisfies a preset third condition, and obtain a third determining result.

The third condition may be a threshold condition. In a specific implementation process, the threshold may be 0.5, and when the ratio exceeds 0.5, a first color corresponding to the first color information is a main color of the favicon.

Step 304: Use the first color information as representative color information of the favicon when the third determining result indicates that the ratio corresponding to the first color information satisfies the preset third condition.

The foregoing step 302 to step 304 actually provide a specific implementation manner for implementing step S102 in the foregoing embodiment, that is, the determining representative color information of the favicon from the original color information of the favicon. The representative color information is main color information.

Step 305: Determine whether the background color information of the tab page and the representative color information of the favicon satisfy a preset first condition, and obtain a first determining result.

The first condition is a condition for determining that a representative color of the favicon is relatively close to the background color of the tab page.

Step 306: Perform first processing on the representative color of the favicon in the process of drawing the favicon when the first determining result indicates that the representative color information of the favicon and the background color information of the tab page satisfy the first condition, and obtain a favicon having target color information.

The first processing is processing for processing a target color of the favicon to be that the background color information of the tab page and the target color information of the favicon do not satisfy the first condition.

The first processing is an opposite-color processing.

The foregoing step 301, step 305, and step 306 separately correspond to step S101, step S103 and step S104 in the foregoing embodiment. Therefore, for understanding step 301, step 305, and step 306, a person skilled in this art may refer to the foregoing embodiment.

In this embodiment of the present disclosure, the performing first processing on the representative color of the favicon, and obtaining a favicon having target color information includes:

acquiring the target color information of the favicon; and performing the first processing on the representative color of the favicon according to the target color information of the favicon, and obtaining the favicon having the target color information.

In this embodiment of the present disclosure, the method further includes: determining whether the background color information of the tab page satisfies a preset second condition, and obtaining a second determining result; and determining whether the target color information of the favicon and the background color information of the tab page satisfy the preset first condition when the second determining result indicates that the background color information of the tab page satisfies the second condition.

In this embodiment of the present disclosure, the determining a ratio of the quantity of pixels occupied by first color information to the total quantity of pixels of the favicon in step 302 may be obtained through the following steps:

First step: Acquire a first pixel point.

The first pixel point is a pixel point in the favicon.

Second step: Determine whether an RGB value of the first pixel point is the same as an RGB value of the first color information.

Third step: Use the first pixel point as a pixel occupied by the first color information when the RGB value of the first pixel point is the same as the RGB value of the first color information.

Fourth step: Traverse all the pixels of the favicon, and obtain the quantity of pixels occupied by the first color information.

In this embodiment, the technical solutions of the embodiments of the present disclosure are described by using the second condition as an example. When the following conditions are satisfied at the same time: 1) the favicon is a solid color picture; 2) the background color of the tab page is a dark-colored background; at this time, the representative color of the favicon is converted into white when the favicon is drawn; and then the converted favicon is drawn. The following continues to use the favicon of WeChat as an example. As shown in FIG. 2-2, FIG. a of FIG. 2-2 is the same as FIG. c of FIG. 1-3, and FIG. b of FIG. 2-2 is the favicon of WeChat after being performed the first processing on. As shown in FIG. b of FIG. 2-2, a main color of the favicon 12 of WeChat has converted from green to white (white is a target color).

Figures 1, 4:
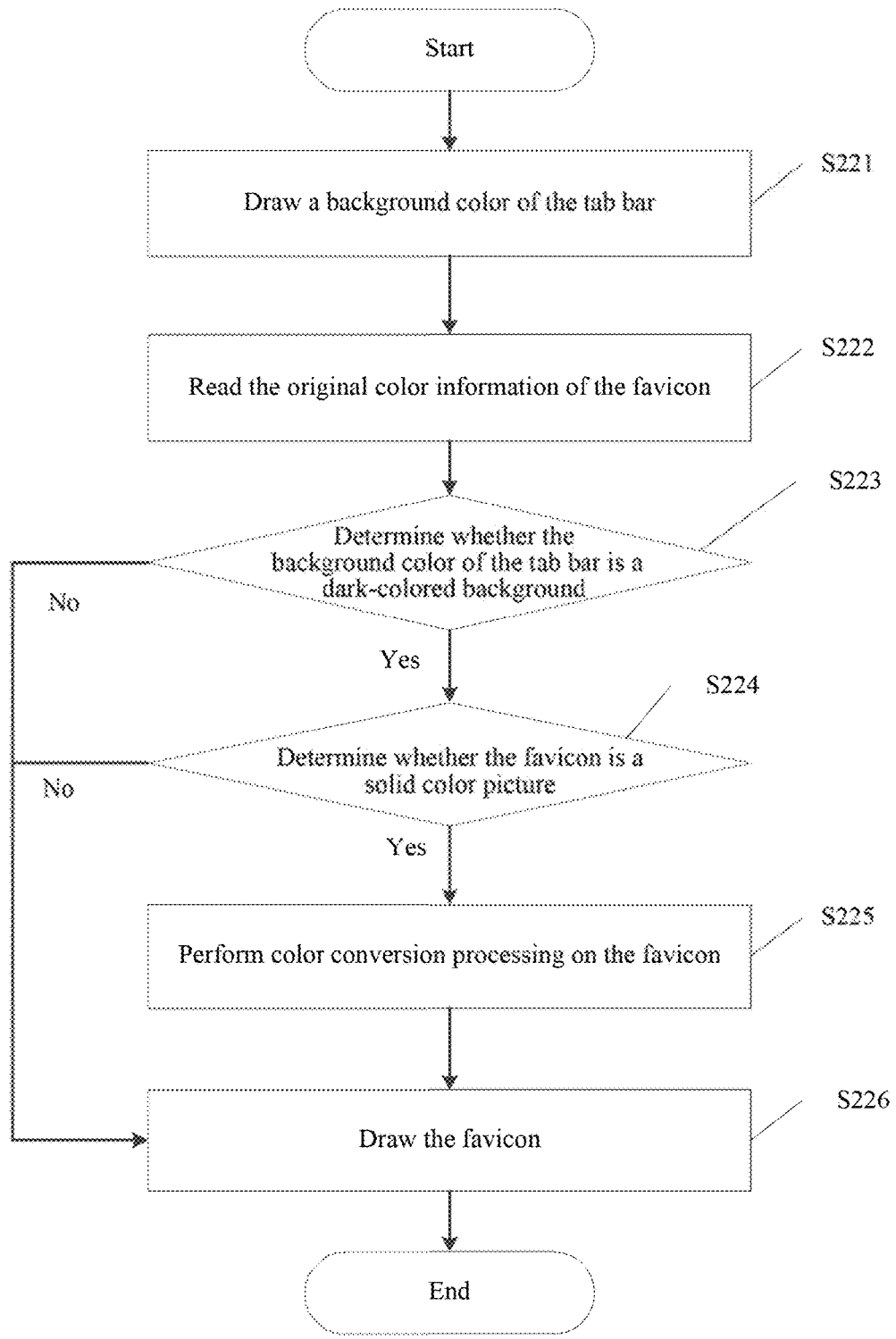
Figures 2, 4:
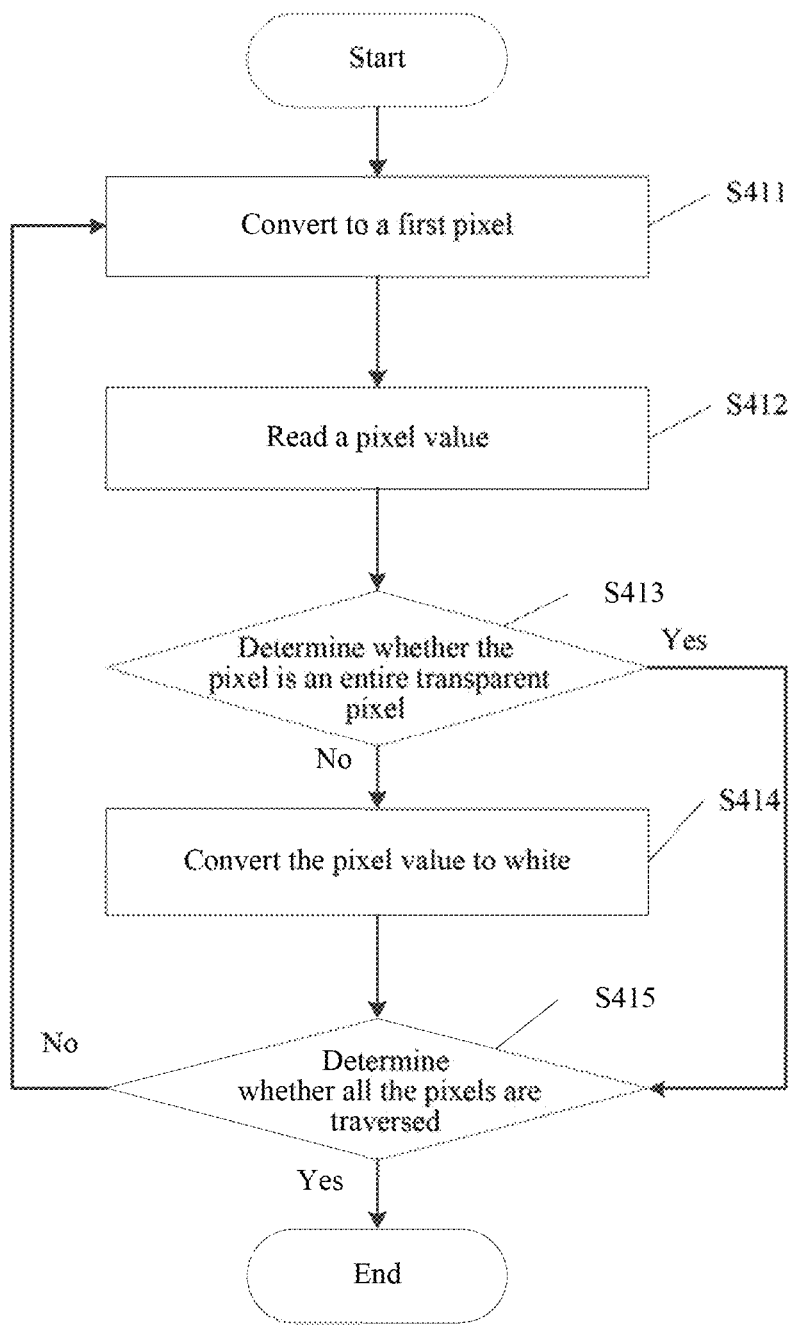

Following the condition 1) and condition 2), a drawing procedure of the tab page is described as follows:

During drawing the tab page process, whether the favicon and the tab page simultaneously satisfy a condition for performing color conversion on the favicon is determined; and if condition 1) and condition 2) are satisfied, the favicon is converted into a solid white picture before drawing. As shown in FIG. 4-1, a processing procedure of the tab page drawing includes the following steps:

Step S221: Draw a background color of the tab bar.

Step S222: Read the original color information of the favicon.

Step S223: Determine whether the background color of the tab bar is a dark-colored background; and if a determining result is yes, enter step S224; otherwise, enter step S226.

Step S224: Determine whether the favicon is a solid color picture; and if a determining result is yes, enter step S225; otherwise, enter step S226.

Step S225: Perform color conversion processing on the favicon.

Step S226: Draw the favicon.

In step S224 of the foregoing procedure, the determining whether the favicon is a solid color picture may include: assuming that the favicon picture uses an ARGB model, and when it is determined that whether the favicon is a solid color picture, removing entire transparent (that is A=0) pixel points. Meanwhile, when it is determined that whether the two pixels are same, transparency of the pixel points may not be considered. As long as RGB values are same, it can be determined that colors of the two pixels are same.

The color conversion of the favicon in step S224 of the foregoing procedure includes: in a dark-colored background, converting the favicon into a white picture, so that a better display effect is ensured. To more faithfully recover the favicon graphic, when the color conversion is performed, in an example, original transparency of all the pixel points in the favicon need to be preserved. If an ARGB value of an original pixel point is [a1, r1, g1, b1], an ARGB value of the converted pixel is [a1, 255, 255, 255], and values of R, G, and B of white are all 255.

When color conversion processing is performed on the favicon, all the pixel points of the favicon need to be traversed. As shown in FIG. 4-2, the entire transparent pixel points may be ignored during conversion process. In this procedure, that ignoring the entire transparent pixels is used as an example, and the procedure includes:

Step S411: Convert to a first pixel.

Step S412: Read a pixel value.

Step S413: Determine whether the pixel is an entire transparent pixel; and if the pixel is the entire transparent pixel, enter step S415; otherwise, enter step S414.

Step S414: Convert the pixel value to white.

Step S415: Determine whether all the pixels are traversed; and if all the pixels are traversed, end; otherwise, enter step S411.

Based on the foregoing embodiments, an embodiment of the present disclosure further provides an information processing apparatus. Units such as a first acquirement unit, a first determining unit, a first judgment unit, and the processing unit in the apparatus may be implemented by using a processor in a terminal, certainly, or may be implemented by using a specific logical circuit. In a specific embodiment process, the processor may be a central processing unit (CPU), a microprocessor (MPU), a digital signal processor (DSP), a field-programmable gate array (FPGA), or the like.

Figure 5:
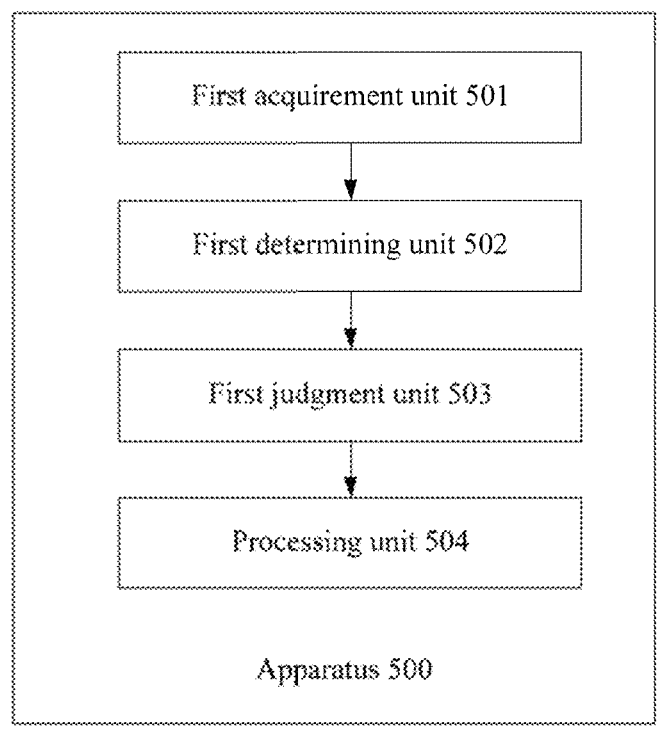
FIG. 5 is a schematic structural diagram of a composition of an information processing apparatus according to an embodiment of the present disclosure.

FIG. 5 is a schematic structural diagram of a composition of an information processing apparatus according to an embodiment of the present disclosure. As shown in FIG. 5, the apparatus 500 includes: a first acquirement unit 501, a first determining unit 502, a first judgment unit 503, and the processing unit 504, where the first acquirement unit 501 is configured to acquire, in a process of drawing a favicon in a tab page, background color information of the tab page and original color information of the favicon;

the first determining unit 502 is configured to determine representative color information of the favicon from the original color information of the favicon;

the first judgment unit 503 is configured to determine whether the background color information of the tab page and the representative color information of the favicon satisfy a preset first condition, and obtain a first determining result; where the first condition is a condition for determining that a representative color of the favicon is relatively close to the background color of the tab page; and the processing unit 504 is configured to perform first processing on the representative color of the favicon in the process of drawing the favicon when the first determining result indicates that the representative color information of the favicon and the background color information of the tab page satisfy the first condition, and obtain a favicon having target color information, where the first processing is processing for processing a target color of the favicon to be that the background color information of the tab page and the target color information of the favicon do not satisfy the first condition.

In this embodiment of the present disclosure, the first processing is an opposite-color processing.

In this embodiment of the present disclosure, the apparatus further includes a second judgment unit, configured to determine whether the background color information of the tab page satisfies a preset second condition, and obtain a second determining result; and trigger the first judgment unit when the second determining result indicates that the background color information of the tab page satisfies the second condition.

It is noted that, the description of the apparatus embodiments is similar to the description of the method embodiments, and has beneficial effects similar to the method embodiments. For technical details that are not disclosed in the apparatus embodiments of the present disclosure, refer to the description of the method embodiments of the present disclosure for understanding.

Based on the foregoing embodiments, an embodiment of the present disclosure further provides an information processing apparatus. Units such as a first acquirement unit, a first determining unit, a first judgment unit, and the processing unit in the apparatus may be implemented by using a processor in a terminal, certainly, or may be implemented by using a specific logical circuit. In a specific embodiment process, the processor may be a central processing unit (CPU), a microprocessor (MPU), a digital signal processor (DSP), a field-programmable gate array (FPGA), or the like.

Figure 6:
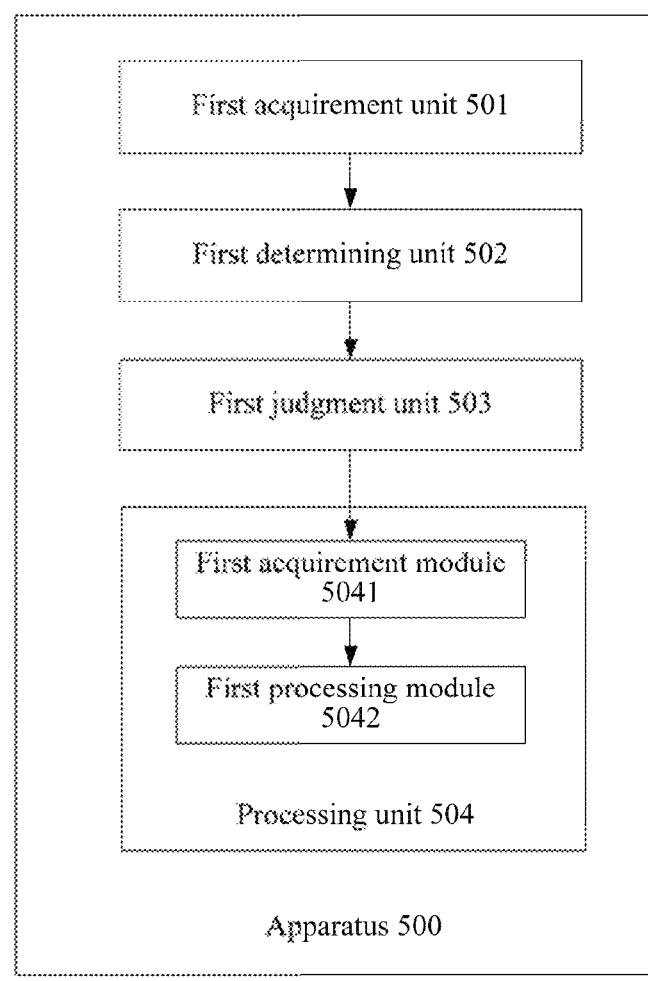
FIG. 6 is a schematic structural diagram of a composition of an information processing apparatus according to an embodiment of the present disclosure.

FIG. 6 is a schematic structural diagram of a composition of an information processing apparatus according to an embodiment of the present disclosure. As shown in FIG. 6, the apparatus 500 includes: a first acquirement unit 501, a first determining unit 502, a first judgment unit 503, and the processing unit 504, where the processing unit 504 includes a first acquirement module 5041 and a first processing module 5042;

the first acquirement unit 501 is configured to acquire, in a process of drawing a favicon in a tab page, background color information of the tab page and original color information of the favicon;

the first determining unit 502 is configured to determine representative color information of the favicon from the original color information of the favicon;

the first judgment unit 503 is configured to determine whether the background color information of the tab page and the representative color information of the favicon satisfy a preset first condition, and obtain a first determining result, where the first condition is a condition for determining that a representative color of the favicon is relatively close to the background color of the tab page;

the first the acquirement module 5041 is configured to acquire target color information of the favicon when the first determining result indicates that the representative color information of the favicon and the background color information of the tab page satisfy the first condition; and the first processing module 5042 is configured to perform the first processing on the representative color of the favicon according to the target color information of the favicon, and obtain the favicon having the target color information.

In this embodiment of the present disclosure, the first acquirement module is configured to determine the target color information of the favicon according to the background color information of the tab page and a preset first rule.

In this embodiment of the present disclosure, the apparatus further includes a second judgment unit, configured to determine whether the background color information of the tab page satisfies a preset second condition, and obtain a second determining result; and trigger the first judgment unit when the second determining result indicates that the background color information of the tab page satisfies the second condition.

It is noted that, the description of the apparatus embodiments is similar to the description of the method embodiments, and has beneficial effects similar to the method embodiments. For technical details that are not disclosed in the apparatus embodiments of the present disclosure, refer to the description of the method embodiments of the present disclosure for understanding.

Based on the foregoing embodiments, an embodiment of the present disclosure further provides an information processing apparatus. Units such as a first acquirement unit, a first determining unit, a first judgment unit, and the processing unit in the apparatus may be implemented by using a processor in a terminal, certainly, or may be implemented by using a specific logical circuit. In a specific embodiment process, the processor may be a central processing unit (CPU), a microprocessor (MPU), a digital signal processor (DSP), a field-programmable gate array (FPGA), or the like.

Figure 7:
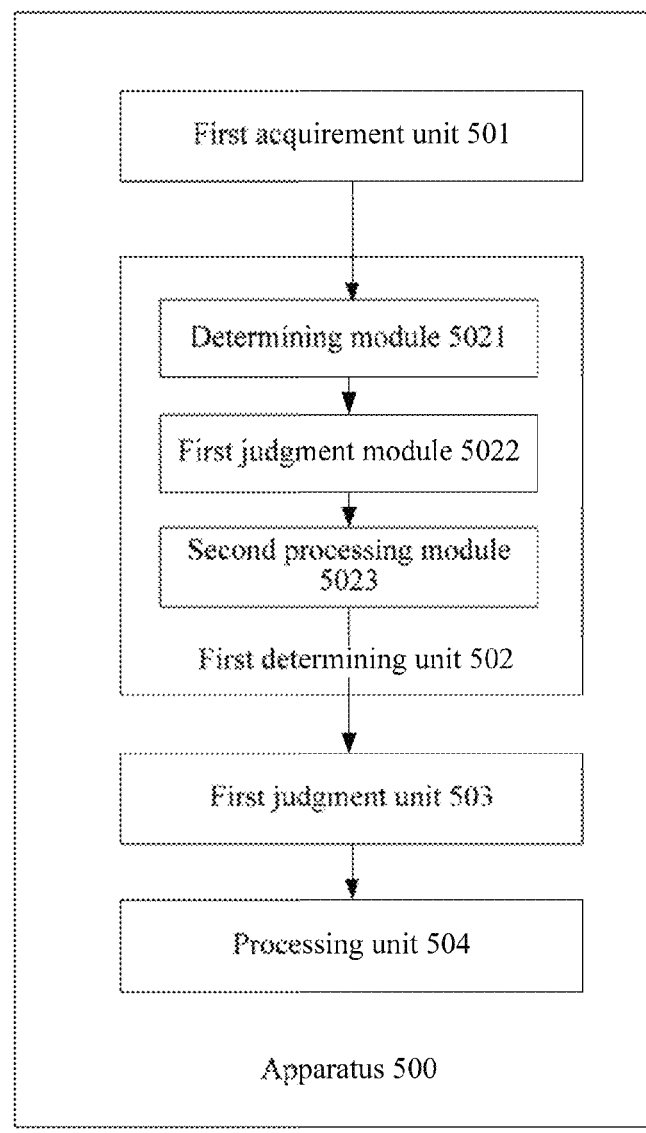
FIG. 7 is a schematic structural diagram of a composition of an information processing apparatus according to an embodiment of the present disclosure.

FIG. 7 is a schematic structural diagram of a composition of an information processing apparatus according to an embodiment of the present disclosure. As shown in FIG. 7, the apparatus 500 includes: a first acquirement unit 501, a first determining unit 502, a first judgment unit 503, and the processing unit 504, where the first determining unit 502 includes a determining module 5021, a first judgment module 5022, and a second processing module 5023;

the first acquirement unit 501 is configured to acquire, in a process of drawing a favicon in a tab page, background color information of the tab page and original color information of the favicon;

the determining module 5021 is configured to determine a ratio of the quantity of pixels occupied by first color information to the total quantity of pixels of the favicon, where the first color information is any one of color information in the original color information of the favicon;

the first the judgment module 5022 is configured to determine whether the ratio corresponding to the first color information satisfies a preset third condition, and obtain a third determining result;

the second processing module 5023 is configured to use the first color information as the representative color information of the favicon when the third determining result indicates that the ratio corresponding to the first color information satisfies the preset third condition;

the first judgment unit 503 is configured to determine whether the background color information of the tab page and the representative color information of the favicon satisfy a preset first condition, and obtain a first determining result, where the first condition is a condition for determining that a representative color of the favicon is relatively close to a background color of the tab page; and the processing unit 504 is configured to perform first processing on the representative color of the favicon in the process of drawing the favicon when the first determining result indicates that the representative color information of the favicon and the background color information of the tab page satisfy the first condition, and obtain a favicon having target color information.

In this embodiment of the present disclosure, the first determining unit further includes a second acquirement module, a second judgment module, a third processing module, and a fourth processing module, where the second acquirement module is configured to acquire a first pixel point, where the first pixel point is a pixel point in the favicon;

the second judgment module is configured to determine whether an RGB value of the first pixel point is the same as an ROB value of the first color information;

the third processing module is configured to use the first pixel point as a pixel occupied by the first color information when the RGB value of the first pixel point is the same as the RGB value of the first color information; and the fourth processing module is configured to traverse all the pixels of the favicon and obtain the quantity of pixels occupied by the first color information.

It is noted that, the description of the apparatus embodiments is similar to the description of the method embodiments, and has beneficial effects similar to the method embodiments. For technical details that are not disclosed in the apparatus embodiments of the present disclosure, refer to the description of the method embodiments of the present disclosure for understanding.

Figures 1, 8:
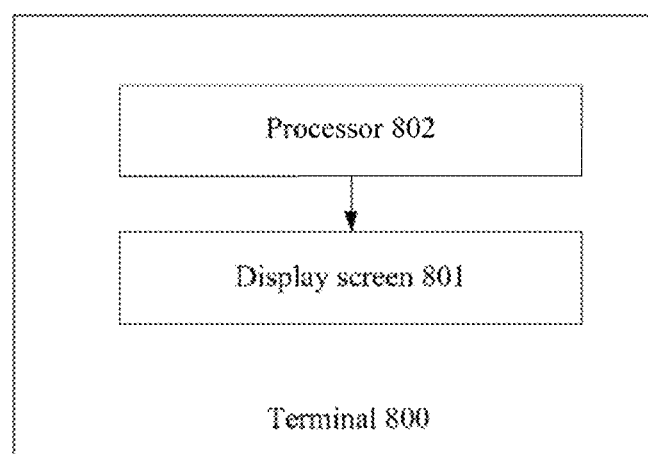
Figures 2, 8:
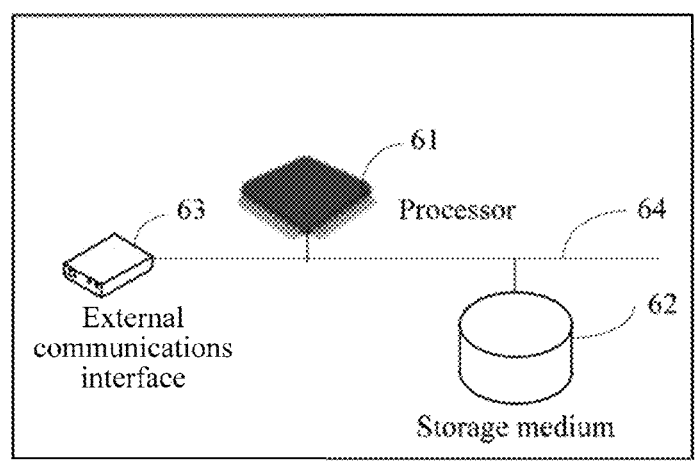

Based on the foregoing embodiments, an embodiment of the present disclosure further provides a terminal. FIG. 8-1 is a schematic structural diagram of a composition of a terminal according to this embodiment of the present disclosure. As shown in FIG. 8-1, the terminal 800 includes a display device (e.g., a display screen 801, a projector and the like) and a processor 802, where the processor 801 is configured to: acquire, in a process of drawing a favicon in a tab page, background color information of the tab page and original color information of the favicon; determine representative color information of the favicon from the original color information of the favicon; determine whether the background color information of the tab page and the representative color information of the favicon satisfy a preset first condition, and obtain a first determining result, where the first condition is a condition for determining that a representative color of the favicon is relatively close to a background color of the tab page; and when the first determining result indicates that the representative color information of the favicon and the background color information of the tab page satisfy the first condition, perform first processing on the representative color of the favicon in the process of drawing the favicon, and obtain a favicon having target color information, where the first processing is processing for processing a target color of the favicon to be that the background color information of the tab page and the target color information of the favicon do not satisfy the first condition; and the display screen 802 is configured to display the favicon having the target color information.

For the processor used for data processing in the terminal, the data processing may be implemented by using a microprocessor, a central processing unit (CPU, Central Processing Unit), a digital signal processor (DSP, Digital Signal Processor), or a field-programmable gate array (FPGA, Field-Programmable Gate Array). For the storage medium, an operation instruction is included. The operation instruction may be computer executable code. Steps in the procedure of the information processing method according to this embodiment of the present disclosure are implemented by using the operation instruction.

An example of a hardware entity of the terminal is shown in FIG. 8-2. The hardware entity includes a processor 61, a storage medium 62, and at least one external communications interface 63. The Processor 61, the storage medium 62, and the external communications interface 63 are connected by means of a bus 64. The external communications interface is used to communicate with a server.

It is noted that, the description of the electronic devices embodiments is similar to the description of the method embodiments, and has beneficial effects similar to the method embodiments. For technical details that are not disclosed in the electronic devices embodiments of the present disclosure, refer to the description of the method embodiments of the present disclosure for understanding.

It is noted that, in the embodiments of the present disclosure, when the foregoing information processing method is implemented in the form of a software functional unit and sold or used as an independent product, the information processing method may be stored in a computer-readable storage medium. Based on such an understanding, the technical solutions of the embodiments of the present disclosure essentially, or the part contributing to the existing technology may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM, Read Only Memory), a magnetic disk, or an optical disc. The embodiments of the present disclosure are not limited to any specific combination of hardware and software.

Correspondingly, an embodiment of the present disclosure further provides a computer storage medium. The computer storage medium stores a computer executable instruction, and the computer executable instruction is used to perform the information processing method of this embodiment of the present disclosure.

It is understood that, reference in the specification to one embodiment or an embodiment means that a particular feature, structure, or characteristic described in connection with the embodiments is included in at least one embodiment of the present disclosure. Therefore, throughout the specification, reference to one embodiment or an embodiment does not mean the reference to the same embodiment. In addition, these specific features, structures, or properties may be combined in one or more embodiments in any proper manner. It is understood that sequence numbers of the foregoing processes do not mean execution sequences in various embodiments of the present disclosure. In an embodiment, the execution sequences of the processes is determined according to functions and internal logic of the processes, and should not be construed as any limitation on the implementation processes of the embodiments of the present disclosure. The sequence numbers of the embodiments of the present disclosure are merely for the convenience of description, and do not imply the preference among the embodiments.

It is noted that the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Unless otherwise specified, an element limited by "include a/an . . . " does not exclude other same elements existing in the process, the method, the article, or the device that includes the element.

In the embodiments provided in the present application, it is understood that the disclosed device and method may be implemented in other manners. The described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections of components may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each oldie units may include alone physically, or two or more units are integrated into one unit. The integrated unit may be implemented through hardware, or may be implemented in a form of hardware plus a software functional module.

A person of ordinary skill in the art may understand that all or some of the steps of the foregoing method embodiments may be implemented by a program instructing relevant hardware. The foregoing program may be stored in a computer readable storage medium. When the program runs, the steps of the foregoing method embodiments are performed. The foregoing storage medium includes: any medium that can store program code, such as a mobile storage device, a ROM, a RAM (Read Only Memory, ROM), a magnetic disk, or an optical disc.

Alternatively, when the integrated unit is implemented in the form of a software functional unit and sold or used as an independent product, the integrated unit may be stored in a computer-readable storage medium. Based on such an understanding, the technical solutions of the embodiments of the present disclosure essentially, or the part contributing to the existing technology may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a removable storage device, a ROM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

INDUSTRIAL APPLICABILITY

In the embodiments of the present disclosure, in a process of drawing a favicon in a tab page, background color information of the tab page and original color information of the favicon are acquired. Representative color information of the favicon is determined from the original color information of the favicon. Whether the background color information of the tab page and the representative color information of the favicon satisfy a preset first condition is determined, and a first determining result is obtained, where the first condition is a condition for determining that a representative color of the favicon is relatively close to a background color of the tab page. When the first determining result indicates that the representative color information of the favicon and the background color information of the tab page satisfy the first condition, a first processing is performed on the representative color of the favicon in the process of drawing the favicon, and a favicon having target color information is obtained. In this case, when a main color of the favicon is close to the background color of the tab page, the favicon can be easily identified from a dark-colored background of the tab page, thereby improving user experience.

What is claimed is:

1. A terminal device, comprising:
a display screen configured to display according to image data generated by processing circuitry; and
the processing circuitry configured to:
determine a first color configuration of a tab page and a second color configuration of an icon;
determine a specific color in the icon from the second color configuration of the icon as a representative color, a ratio of a number of pixels of the specific color in the icon to a total number of pixels in the icon being larger than a preset threshold;
determine a background color of the tab page from the first color configuration;
determine whether the background color of the tab page and the representative color of the icon satisfy a first condition that indicates a lack of discernibility over the background color by comparing the background color and the representative color;
adjust the second color configuration of the icon when the representative color is determined to lack discernibility over the background color of the tab page based on the first condition;
generate the image data; and
display, on the display screen, the icon having the adjusted second color configuration in the tab page of the first color configuration based on the generated image data for a user of the terminal device.

2. The terminal device according to claim 1, wherein the processing circuitry is configured to receive a target color configuration that is discernible over the background color of the tab page, and adjust the second color configuration of the icon based on the target color configuration.

3. The terminal device according to claim 2, wherein the processing circuitry is configured to determine the target color configuration of the icon according to the background color of the tab page and a contrasting color rule.

4. The terminal device according to claim 1, wherein the processing circuitry is configured to determine a complementary color to the background color of the tab page, and adjust the second color configuration according to the complementary color.

5. The terminal device according to claim 1, wherein the processing circuitry is configured to determine whether the background color of the tab page satisfies a second condition for detecting a darkness level, and determine whether the background color of the tab page and the representative color of the icon satisfy the first condition when the second condition is satisfied.

6. The terminal device according to claim 1, wherein the processing circuitry is configured to adjust the second color configuration of the icon without changing a transparency of the icon.

7. A method for generating image data for displaying on a display screen of a terminal device, the method comprising:
determining, by processing circuitry, a first color configuration of a tab page and a second color configuration of an icon;
determining a specific color in the icon from the second color configuration of the icon as a representative color, a ratio of a number of pixels of the specific color in the icon to a total number of pixels in the icon being larger than a preset threshold;
determining a background color of the tab page from the first color configuration;
determining whether the background color of the tab page and the representative color of the icon satisfy a first condition that indicates a lack of discernibility over the background color by comparing the background color and the representative color;
adjusting the second color configuration of the icon when the representative color is determined to lack discernibility over the background color of the tab page based on the first condition;
generating the image data; and
displaying, on the display screen, the icon having the adjusted second color configuration in the tab page of the first color configuration based on the generated image data for a user of the terminal device.

8. The method according to claim 7, wherein the adjusting the second color configuration of the icon when the representative color is determined to lack discernibility over the background color of the tab page based on the first condition comprises:
receiving a target color configuration that is discernible over the background color of the tab page; and
adjusting the second color configuration of the icon based on the target color configuration.

9. The method according to claim 8, wherein the receiving the target color configuration that is discernible over the background color of the tab page comprises:
determining the target color configuration of the icon according to the background color of the tab page and a contrasting color rule.

10. The method according to claim 7, wherein the adjusting the second color configuration of the icon when the representative color is determined to lack the discernibility over the background color of the tab page based on the first condition comprises:
determining a complementary color to the background color of the tab page.

11. The method according to claim 7, further comprising:
determining whether the background color of the tab page satisfies a second condition for detecting a darkness level; and
determining whether the background color of the tab page and the representative color of the icon satisfy the first condition when the second condition is satisfied.

12. The method according to claim 7, wherein the adjusting the second color configuration of the icon when the representative color is determined to lack the discernibility over the background color of the tab page based on the first condition comprises:
adjusting the second color configuration of the icon without changing a transparency of the icon.

13. A non-transitory computer readable medium storing program instructions for causing a processor in a terminal device to perform a method for generating image data for displaying on a display screen of the terminal device, the method comprising:

determining, by the processor, a first color configuration of a tab page and a second color configuration of an icon;

determining a specific color in the icon from the second color configuration of the icon as a representative color, a ratio of a number of pixels of the specific color in the icon to a total number of pixels in the icon being larger than a preset threshold;

determining a background color of the tab page from the first color configuration;

determining whether the background color of the tab page and the representative color of the icon satisfy a first condition that indicates a lack of discernibility over the background color by comparing the background color and the representative color;

adjusting the second color configuration of the icon when the representative color is determined to lack discernibility over the background color of the tab page based on the first condition;

generating image data; and displaying, on the display screen, the icon having the adjusted second color configuration in the tab page of the first color configuration based on the generated image data for a user of the terminal device.

14. The non-transitory computer readable medium according to claim 13, wherein the adjusting the second color configuration of the icon when the representative color is determined to lack the discernibility over the background color of the tab page based on the first condition comprises:

receiving a target color configuration that is discernible over the background color of the tab page; and adjusting the second color configuration of the icon based on the target color configuration.

15. The non-transitory computer readable medium according to claim 14, wherein the receiving the target color configuration that is discernible over the background color of the tab page comprises:

determining the target color configuration of the icon according to the background color of the tab page and a contrasting color rule.

16. The non-transitory computer readable medium according to claim 13, wherein the adjusting the second color configuration of the icon when the representative color is determined to lack the discernibility over the background color of the tab page based on the first condition comprises:

determining a complementary color to the background color of the tab page.

17. The non-transitory computer readable medium according to claim 13, wherein the method further comprises:

determining whether the background color of the tab page satisfies a second condition for detecting a darkness level; and determining whether the background color of the tab page and the representative color of the icon satisfy the first condition when the second condition is satisfied.

\* \* \* \* \*